No. 854,505.  
PATENTED MAY 21, 1907.  
H. B. KEIPER.  
BALL BEARING.  
APPLICATION FILED FEB. 18, 1907.
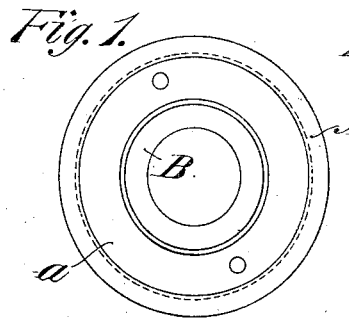
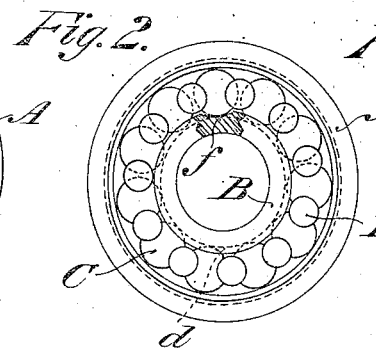
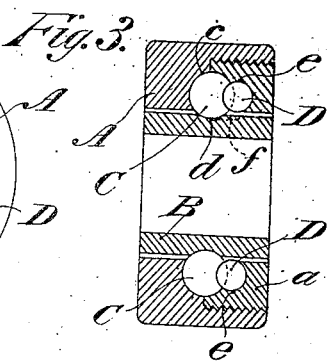
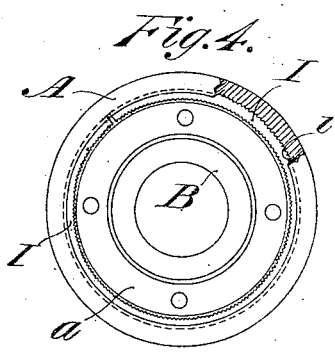
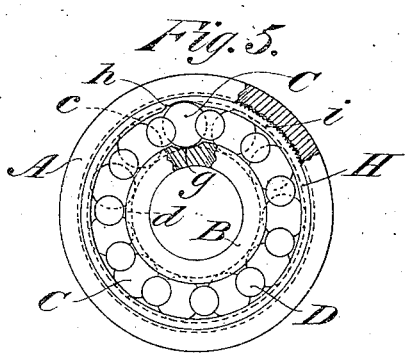
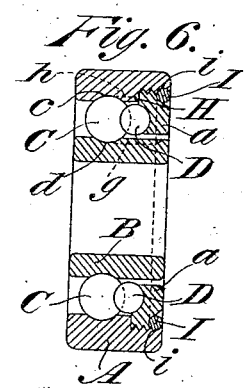
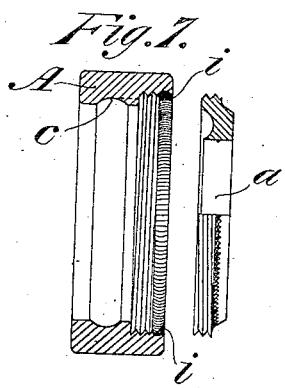
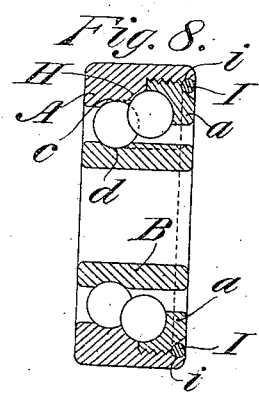
WITNESSES  
INVENTOR  
Henry B. Keiper  
His Attorneys

UNITED STATES PATENT OFFICE.

HENRY BRINSER KEIPER, OF LANCASTER, PENNSYLVANIA.

BALL-BEARING.

No. 854,505.　　　　Specification of Letters Patent.　　　　Patented May 21, 1907.

Application filed February 18, 1907. Serial No. 357,909.

*To all whom it may concern:*

Be it known that I, HENRY BRINSER KEIPER, a citizen of the United States, residing at Lancaster, in the county of Lancaster and State of Pennsylvania, have invented certain new and useful Improvements in Ball-Bearings; and I do hereby declare the following to be a full, clear, and exact description of the invention, such as will enable others skilled in the art to which it appertains to make and use the same.

This invention relates to ball-bearings having spherical rollers or balls confined in ball-races between concentric rings or annular bearing members.

As well known, where a full number of balls are employed, the contacting surfaces of adjacent balls move in opposite directions, thereby producing friction. To avoid this objection, various devices have been used to separate and hold the balls apart; but such devices usually occupy considerable space that might otherwise be filled with balls, thus reducing the number of balls employed and consequently weakening the bearing, and they also present points or surfaces with which the caged balls contact, resulting in friction and wear. On the other hand, unless the adjacent balls are kept apart or out of contact with each other, there results not only objectionable friction and wear, but the balls will noisily clash and knock against each other, and, as the speed of rotation increases the balls will tend to roll onto or over one another with consequent injury. It is apparent, therefore, that each class of ball-bearings, respectively known as the "full type" and "silent type," has certain advantages as well as certain objectionable features peculiar to its own type. The "full type" is desirable because of the larger number of balls employed, increasing the capacity, strength and stability of the bearing, but it is subject to the noise, friction and injurious effects produced by the oppositely moving contacting surfaces of adjacent balls; while the "silent type" avoids such objections but has the disadvantage of diminishing the number of balls and thus weakening the bearing.

The principal object of this invention is to combine in one device all the advantages and benefits of both the "full type" and "silent type" of ball-bearings, without the objectionable features of either.

To this end the invention consists essentially of an improved ball-bearing comprising two or more concentric rings or annular bearing-members having balls confined therebetween in a plurality of annular rows or series working side by side in adjacent parallel ball-races, the two rings having the aforesaid ball-races wholly constructed therein and serving as the means for confining both series of balls in their respective races and holding them positively to their work, so that the balls of each series are confined to their own race and perform their prescribed function without otherwise affecting or interfering with the work of the other series; the balls of one series alternating with and serving solely as separating means for the balls of the other series which latter are thus maintained in slightly separated relation while sustaining pressure and at the same time holding the two rings together or preventing separation thereof when in use.

An exemplification of the invention is illustrated in the accompanying drawings, forming a part of this specification, wherein:

Figure 1 is a side view of a ball-bearing embodying my invention; Fig. 2 is a similar view having a part of the inner ring broken away and a detachable member of the outer ring removed, so as to show the interior construction and the arrangement of the balls; Fig. 3 is a central vertical cross section of the same; Fig. 4 is a side view of a modification having a part of the outer ring broken away; Fig. 5 is a view of said modification similar to Fig. 2, and Fig. 6 is a central vertical cross section of the same; Fig. 7 is a central vertical cross-section of the outer ring of said modification, showing the main portion and detachable member thereof separated; and Fig. 8 is a central vertical cross section of another modification.

In Figs. 1, 2 and 3 A and B denote concentric bearing-rings, between which the balls are confined. The outer bearing-ring A is separable, having a detachable member $a$ screwed therein. C denotes an annular row of balls, confined and running in confronting grooves $c$ and $d$ in the rings A and B. The groove $c$ in the outer ring, as shown in Fig. 3, is formed partly in the main portion A and partly in the detachable member $a$ of said outer ring. The series of balls C sustain the pressure of the bearing when the latter is arranged between a shaft or axle and a bearing-box therefor or the hub of a wheel or other element. On the inner side of the removable member a is formed an annular groove e, forming a supplementary ball-race parallel with and adjacent to the ball-race formed by the grooves c and d in which the balls C are confined, and confronting said balls C. A series of balls D are fitted in said supplementary race or groove e, and arranged to alternate with the balls C, so that each ball D lies against and slightly separates two of the balls C, when the member a is secured in proper position in the main portion of the outer ring A. The balls D are preferably smaller than the balls C and separate the latter only a sufficient distance to keep their confronting surfaces from touching, but without interfering with or partaking of the function of the larger balls, which alone sustain the pressure of the bearing, while the smaller balls serve merely as separators for the larger balls and revolve by contact therewith, so that the contacting surfaces of the two series of balls move in the same direction; thus avoiding the friction, noise and injurious effects resulting from the oppositely moving contacting surfaces of the adjacent balls in a "full type" bearing. At the same time, a full number or complement of the larger balls C may be used, it being observed that the aggregate sums of the spaces or distances between the adjacent balls C is less than the diameter of a single ball. Thus the full capacity and strength of the bearing is obtained, while yet each series of balls is separated sufficiently to prevent them from touching; thereby obviating objectionable friction, noise and injurious effects, and without the disadvantages of spacing devices such as are used in ball-bearings of the "silent type." The construction is such that the larger balls C will be confined to their own ball-race if the smaller balls D should be removed, while the latter are also confined to their own ball-race e and held by the member a in proper relation; so that no lateral motion of either row of balls is permitted, excepting what is necessary to allow free rotation of the balls, and neither series of balls can crowd upon or interfere with the performance of the function of the other series. To prevent the larger balls from dropping out when the removable member or retaining ring a and its balls D are removed, the diameters of the larger balls may be greater than the entrance to the ball-race formed by the grooves c and d, and provision is made for inserting the balls C one at a time by providing a recess or notch as at f intersecting the groove d on the outer surface of the inner ring B; but such recess or notch f might be dispensed with by enlarging that portion of the ball-race which is formed in the inner surface of the outer ring A. I thus produce a smooth-running and noiseless ball-bearing having great strength and stability, and possessing all the advantages of ball-bearings of both the "full type" and "silent type," without the disadvantages or objectionable features of either.

In Figs. 4, 5 and 6 I have shown a modification in which the groove for the larger balls C in the outer ring is formed entirely in the main portion A instead of partly therein and partly in the detachable section or retaining ring a, and in order to insert said balls one at a time, I provide a groove g in the periphery of the inner ring adapted to register with a notch h in the annular rib H which forms the inner wall of the annular groove in the inner surface of the outer ring, said groove g and notch h being shown in full lines in Fig. 5 and indicated in dotted lines in Fig. 6. Otherwise the construction is substantially the same as in Figs. 2 and 3, except the hereinafter mentioned device for locking the section a to its seat.

For conveniently inserting the balls in the bearing shown in Figs. 4, 5 and 6, the two concentric rings, placed one within the other, may be laid upon a table or flat surface, with the side shown in Figs. 4 and 5 uppermost, and with the groove g and notch h in registering position, whereupon the balls C may be inserted one at a time until the ball-race is filled. The required number of smaller balls D are then placed upon the larger balls, one between each pair, and the retaining ring or removable section a with its supplementary ball-race is then secured within the main portion of the outer ring, so that the double series of balls are held in proper relation to each other, with the smaller balls bearing upon the sides of the larger balls and slightly separating them, as already explained.

In Fig. 8, a double series of balls of the same size are employed, one of which series serves the purpose of separating the confronting surfaces of the balls of the other series while the latter sustain the pressure of the bearing and also hold the two rings together. In this case, a groove in the periphery of the inner ring extending transversely to the ball-races, and adapted to register with a notch in the rib H of the outer ring, as indicated by dotted lines, permits the insertion of the balls, one at a time, until the ball-race is filled to its full capacity.

To prevent the detachable section a of the outer ring from turning and to hold it firmly to its seat, when in use, an annular recess i may be formed in the outer margin or periphery thereof, as shown in Figs. 4 to 7, adapted to receive an elastic band or hoop I which is divided so that it may be sprung into said recess, and thereby lock said section a in normal position. Said hoop or band has preferably roughened or milled surfaces engaging correspondingly roughened surfaces of the recess into which it fits, as shown in Figs. 4 and 7, though plain surfaces may suffice, as shown in Fig. 8.

It will be observed that in my improved ball-bearing the concentric rings or cylinders are adapted to serve the purpose of confining a plurality of annular series of balls in suitable races formed in their confronting surfaces and that the confined balls of one of such annular series serve as bearings for the rings between which they are confined and are adapted to hold the rings together, so as to prevent endwise movement or separation thereof when in use, while the other series of balls serve solely as a means for holding the balls of the first named series in slightly separated relation and are confined to the race formed in one of said confronting surfaces only, so that all contacting surfaces of the balls move in the same direction, thereby avoiding undue friction and wear and providing an easy-running, noiseless bearing.

Having thus described my invention, what what I claim as new and desire to secure by Letters Patent of the United States is:

1. A ball-bearing comprising concentric rings or cylinders arranged one within another and having annular grooves in their confronting surfaces forming a main ball-race with provision for inserting balls one at a time in said race, and an annular series of balls confined therebetween in said main ball-race adapted to sustain pressure and also hold the rings together, there being a supplementary ball-race in one of said surfaces only confronting said series of balls, and an annular series of balls confined in said supplementary race serving solely as means for separating adjacent balls of the other series the balls being removably inserted, permitting the assembled parts to be separated.

2. A ball-bearing comprising concentric rings arranged one within another and having annular grooves in their confronting surfaces together forming a main ball-race with provision for inserting balls one at a time in said race, and a series of balls therebetween confined in said ball-race for sustaining pressure, one of said rings having formed therein a supplementary ball-race confronting said series of balls, and another series of balls confined to said supplementary ball-race so as to alternate with and serve solely as a means for slightly separating adjacent walls of the first-mentioned series, the latter being adapted to hold the rings together irrespective of the other series of balls, the balls being removably inserted, permitting the assembled parts to be separated.

3. A ball-bearing comprising concentric rings or cylinders arranged one within another and constructed with a plurality of ball-races in their confronting surfaces with provision for inserting and means for confining balls in one of said races in such manner that the confined balls will hold the rings together, one of said races being formed in one of said surfaces only so as to confront a series of balls in an adjacent ball-race, and an annular series of balls confined between said rings in each of said races, the balls of one series being smaller than those of the other series and confined to their race by contact therewith and with the larger balls only, and serving solely as a means for slightly separating the confronting surfaces of the larger balls, which alone sustain the pressure, and hold the rings together the balls being removably inserted, permitting the assembled parts to be separated.

4. A ball-bearing comprising concentric bearing-rings with an interposed series of pressure-sustaining balls running in confronting tracks in the opposed surfaces of said rings, and a second series of balls arranged beside and alternating with the balls of the first series and serving solely as means for separating the balls of the first series, said second series of balls running in a single track confronting said first series of balls and formed wholly in one only of the said rings, which latter ring is made in separable parts and constitutes the sole means for supporting the second series of balls in proper relation to the first series, the balls being removably inserted, permitting the assembled parts to be separated.

5. A ball-bearing comprising two concentric rings or cylinders having a plurality of ball-races formed in their confronting surfaces with provision for inserting balls in said races, one of said races being formed in one of said surfaces only, and an annular series of balls confined in each of said ball races, one of said series sustaining pressure and also adapted to prevent endwise movement or separation of the rings between which they are confined, while the other series serve solely as means for separating the pressure-sustaining balls with which they alternate, being held in contact therewith by the ring in which they are confined and without touching the other ring, so that the contacting surfaces of the balls of both series move in the same direction, the balls being removably inserted, permitting the assembled parts to be separated.

6. A ball-bearing device comprising a plurality of concentric rings or cylinders, the outer ring having a removable portion and a plurality of interior annular grooves, one of said grooves forming a supplementary ball-race in said removable portion only, and the inner ring having a peripheral annular groove confronting one of the grooves in the outer ring, thus forming a main ball-race, a series of balls confined in each of said ball-races, the balls of one series alternating with those of the other series and serving solely as means for holding their confronting surfaces in slightly separated relation, while the latter series of balls irrespective of the former hold the rings together but permit free rotation.

7. A ball-bearing comprising two concentric rings or cylinders one of which is constructed in separable parts, the two rings having adjacent parallel ball-races in their confronting surfaces, one of said races being formed by an annular groove in the periphery of the inner ring and a similar groove in the confronting surface of the main portion of the outer ring and the other race being formed solely in a detachable section of the outer ring, balls confined in said races between said confronting surfaces in two annular series arranged side by side, the balls of one series alternating with and serving solely as separating means for the balls of the other series and the latter irrespective of the former adapted to sustain pressure and also prevent endwise movement or separation of the rings.

8. A ball-bearing device comprising two concentric rings or cylinders one of which is constructed in separable parts, the outer ring having interior annular grooves therein and the inner ring having an annular groove in its periphery confronting one of the grooves in the outer ring, thereby forming a main ball-race and a supplementary ball-race, said outer ring having an interior annular rib separating said races, and balls confined in said races in two annular series arranged side by side, the balls of one series alternating with and serving as separating means for the balls of the other series, said annular rib having a notch therein, and said inner ring having a groove intersecting the annular groove in its periphery and adapted to register with said notch, for inserting the balls one at a time in said main ball-race and adapting such balls to hold the two parts together without other fastening means.

9. A ball-bearing device comprising two concentric rings or cylinders arranged one within the other, the outer ring having a removable section and a plurality of interior annular grooves, and the inner ring having a peripheral annular groove confronting one of the grooves in the outer ring, thereby forming a plurality of ball-races, a series of balls in each of said ball-races, one series alternating with those of the other series and holding their confronting surfaces in slightly separated relation, and an elastic band engaging an annular recess between the main portion of the outer ring and the periphery of said removable section so as to lock the latter in place.

In testimony whereof I affix my signature, in presence of two witnesses.

HENRY BRINSER KEIPER.

Witnesses:
    CHAS. E. LONG,
    EDWARD DONOHOE.